(12) United States Patent
Hayes

(10) Patent No.: US 6,305,590 B1
(45) Date of Patent: Oct. 23, 2001

(54) SPORT VEHICLE LUGGAGE BAG WITH DETACHABLE MAP POUCH

(75) Inventor: Christopher J. Hayes, Rockford, MI (US)

(73) Assignee: Specialty Sports Limited, Rockford, MI (US)

( * ) Notice: Subject to any disclaimer, the term of this patent is extended or adjusted under 35 U.S.C. 154(b) by 0 days.

(21) Appl. No.: 09/368,776

(22) Filed: Aug. 5, 1999

(51) Int. Cl.[7] ........................................................ B62J 11/00
(52) U.S. Cl. ........................ 224/413; 190/110; 224/401; 224/419; 224/428; 224/431
(58) Field of Search ................... 224/401, 413, 224/417, 419, 418, 429, 430, 431, 439, 440, 442, 447, 450, 463, 277, 484, 583, 425; 383/117; 190/110; 280/288.4

(56) References Cited

U.S. PATENT DOCUMENTS

| | | | |
|---|---|---|---|
| 3,061,057 | * 10/1962 | Miller | 190/110 |
| 4,059,207 | * 11/1977 | Jackson et al. | 224/413 X |
| 4,068,859 | * 1/1978 | Dittman | 280/289 |
| 4,303,184 | * 12/1981 | Kloth | 224/413 X |
| 4,359,233 | * 11/1982 | Jackson et al. | 280/289 X |
| 4,424,841 | * 1/1984 | Smith | 224/583 X |
| 4,469,256 | * 9/1984 | McEwen | 224/419 X |
| 4,580,667 | * 4/1986 | Herwood | 383/117 |
| 5,897,040 | * 4/1999 | Ward | 224/413 |
| 5,971,119 | * 10/1999 | Chi | 190/110 |
| 6,029,875 | * 2/2000 | Johnston | 224/417 |

FOREIGN PATENT DOCUMENTS

4107008 * 9/1992 (DE) .............................. 224/419 X

* cited by examiner

*Primary Examiner*—Gregory M. Vidovich
*Assistant Examiner*—Maerena W. Brevard
(74) *Attorney, Agent, or Firm*—Price, Heneveld, Cooper, DeWitt & Litton

(57) ABSTRACT

An article of luggage for a sport vehicle, such as a snowmobile or a motorcycle, includes a bag having at least one strap for releasably securing the bag to the sport vehicle, and a map pouch which is releasably attached to the bag. The releasably attached map pouch may include at least one strap which allows the map pouch to be secured to the sport vehicle independent of the bag. The combination tank bag with releasably attached map pouch provides the operator of the sport vehicle with an opportunity to secure the bag to the sport vehicle with or without the map pouch releasably attached to the bag, and allows the map pouch to be secured to the sport vehicle without the bag, as desired.

4 Claims, 1 Drawing Sheet

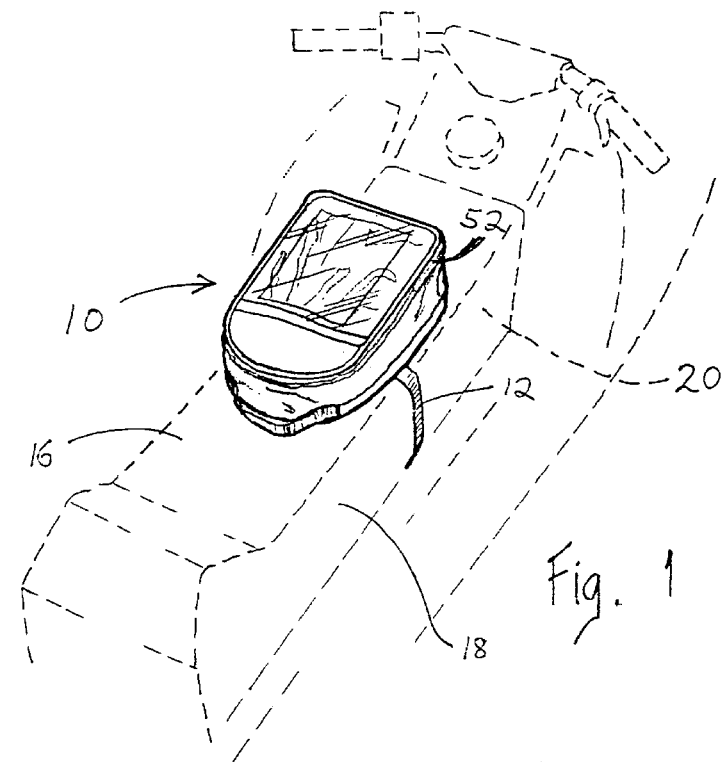
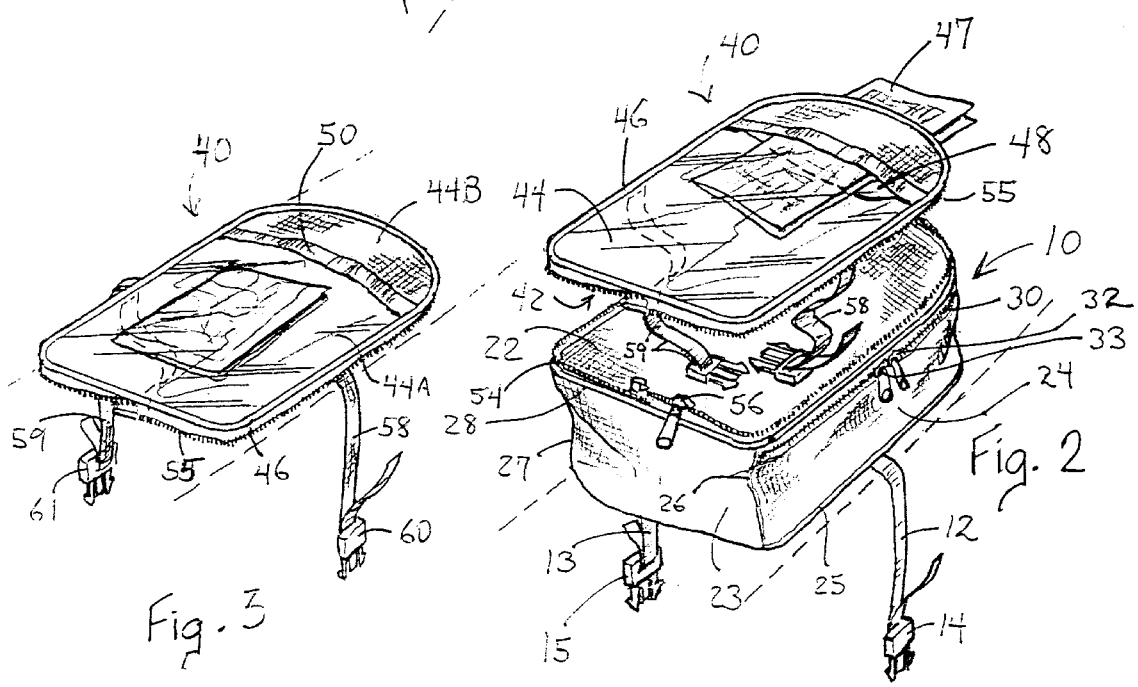

SPORT VEHICLE LUGGAGE BAG WITH DETACHABLE MAP POUCH

FIELD OF THE INVENTION

This invention relates to the field of sport vehicle luggage bags.

BACKGROUND OF THE INVENTION

Luggage bags which can be strapped to sport vehicles such as snowmobiles or motorcycles are well known. Likewise, it is know to provide a map pouch which can be strapped over the fuel tank of a sport vehicle in a position in front of the driver of the sport vehicle so that the driver can easily glance down at a map visibly displayed through the map pouch without the driver needing to twist his/her neck to the left or right.

Map pouches for sport vehicles typically have an envelope-like structure made of waterproof or water resistant material with an opening for inserting a map. At least a portion of the topside of the map pouch is made of a transparent material, e.g., transparent plastic sheet, which allows at least a portion of the map contained in the map pouch to be displayed. The map pouch typically includes a pair of straps which allow the map-pouch to be secured to the sport vehicle.

Tank bags for sport vehicles, such as motorcycles and snowmobiles, typically have a size and shape which is about the same as a typical backpack, and generally include at least a pair of straps for securing the tank bag on the upper surface of a snowmobile. A tank bag secured over the fuel tank of a sport vehicle allows the sport vehicle driver to easily store and retrieve items without leaving his/her seat.

Often sport vehicle drivers wish to have both easy access to items stored in a bag mounted over the fuel tank, and a map visibly displayed through a protective map pouch mounted over the fuel tank. Although it is possible to provide the sport vehicle with fastening means for separately securing both a tank bag and a map pouch over the fuel tank, with the map pouch stacked over the tank bag, this arrangement has several disadvantages. One disadvantage is that the straps of the map pouch would overlap the sides of the tank bag interfering with the tank bag closures (e.g., zippers) and make it difficult to store items within and retrieve items from the tank bag. Another disadvantage with securing a tank bag over the fuel tank of a sport vehicle and separately securing a map pouch to the vehicle with the map pouch disposed over the tank bag is that the map pouch may tend to slide forwardly or rearwardly with respect to the tank bag creating a sloppy appearance. This is especially a problem when items are added to and/or removed from the tank bag, because the thickness of tank bags which are typically made of a flexible fabric is dependent on what is contained in the tank bag. Thus, drivers of sport vehicles having a tank bag secured over the fuel tank and a map pouch separately secured to the vehicle with the map pouch disposed over the upper surface of the tank bag may find it necessary to release the map pouch from the vehicle to obtain access to the contents of the tank bag, and after adding items to or removing items from the tank bag, re-secure the map pouch to the vehicle and readjust the strap lengths to compensate for changes in the thickness of the tank bag caused by adding items to or removing items from the tank bag. It may also become necessary to readjust the straps on account of changes in the thickness of the tank bag caused by shifting of the contents within the tank bag, even when items have not been added to or removed from the tank bag.

One way of providing easy access to items stored in a tank bag mounted on the fuel tank of a sport vehicle, such as a motorcycle or a snowmobile, while also visably displaying a map through a protective map pouch disposed over the tank bag, would be to make the map pouch an integral part which is permanently fixed on the tank bag. However, this has several disadvantages. One disadvantage is that the map pouch cannot be secured to the sport vehicle by itself without the tank bag. Likewise, the tank bag cannot be secured to the sport vehicle by itself without the map pouch. This can be a disadvantage when the sport vehicle driver wishes to carry the map pouch with the map displayed and protected, but wishes to leave the tank bag secured to the sport vehicle.

SUMMARY OF THE INVENTION

In accordance with one aspect of the invention, an article of luggage for a sport vehicle includes a bag having at least one strap for releasably securing the bag to a sport vehicle, and a map pouch releasably attached to the bag. The sports bag can be secured to a sport vehicle by itself, or with the map pouch releasably secured to the bag.

In accordance with another aspect of the invention, the map pouch includes at least one strap for releasably securing the map pouch to the sport vehicle independent of the bag.

The combination of features of this invention allow the sport vehicle operator to secure the bag to the sport vehicle by itself, secure the map pouch to the sport vehicle by itself, or secure the bag to the sport vehicle with the map pouch releasably attached to the bag, as desired. The releasable attachment of the map pouch to the bag allows items to be inserted into the bag or removed from the bag without having to remove the map pouch, and without having to readjust straps to compensate for expansion or contraction of the bag, as would be required if the map pouch was separately secured to the sport vehicle. Further, the releasable attachment of the map pouch to the sports bag allows separation of the map pouch from the bag and the sport vehicle without requiring separation of the bag from the sport vehicle.

BRIEF DESCRIPTION OF THE DRAWINGS

FIG. 1 is a perspective view of the combination tank bag and releasably attached map pouch secured to a snowmobile;

FIG. 2 is a perspective view showing the map pouch separated from the tank bag; and FIG. 3 is a perspective view of the map pouch by itself.

DESCRIPTION OF THE PREFERRED EMBODIMENTS

In FIG. 1, there is shown a sports bag 10 secured to a snowmobile 20 (shown in dashed lines). Tank bag 10 includes straps 12, 13 which are used to secure tank bag 10 to vehicle 20. In the illustrated embodiment, straps 12, 13 each include male connectors 14, 15 which lockably and releasably engage female connectors (not shown) which are permanently affixed to a sport vehicle. For example, the female connectors can be attached to straps which may, for example, be secured to a strap-anchoring device riveted to the sport vehicle. Connectors 14, 15 may be any suitable connector which allows quick, easy and secure connection to the sport vehicle, and quick and easy disconnection from the sport vehicle. Tank bag 10 is a sport vehicle luggage bag which has approximately the same size and shape of a typical backpack. However, it is designed with straps 12, 13 fixed to an underside of bag 10 to allow tank bag 10 to be secured on an upper surface of snowmobile seat 18. Luggage bag 10 is referred to as a tank bag because it is secured on seat 16 which itself is located over the fuel tank of the snowmobile. A substantially similar or identical tank bag may be secured to an upper surface of another type of sport vehicle, such as a motorcycle.

Bag 10 generally comprises a plurality of fabric panels, including a top panel 22, a similarly shaped bottom panel (not shown), and one or more side panels 23, 24, which are stitched together, such as at edges 25, 26, 27 and 28 to define a closable bag.

In the illustrated embodiment, tank bag 10 is closable by means of a zipper 30 which extends along an upper edge of panel 24 from seam 26 to seam 27. Zipper 30 may be provided with two slidable tabs 32, 33. This has the advantage of allowing an opening of generally any size, up to the length of the zipper, to be defined at any location along the length of zipper 30.

Shown in FIGS. 2 and 3 is a map pouch 40 which is detachably connectable to tank bag 10. Map pouch 40 is an envelope-like pouch comprising a bottom panel 42, and a top panel 44 which has a shape generally the same as bottom panel 42. Bottom panel 42 and top panel 44 are connected together along their edges to form a perimeter seam 46. Bottom panel 42 may be an opaque flexible plastic panel, and top panel 44 is preferably a flexible plastic sheet, at least a portion of which is transparent to allow a map 47 or at least a portion thereof, to be visably displayed through the transparent portion of upper panel 44 when map 47 is inserted into map pouch 40 through an opening 48 at one end of the map pouch. In the illustrated embodiment, upper panel 44 is a composite panel including a transparent portion 44A and an opaque portion 44B, which are connected together along seam 50. The various seams 25, 26, 27, 28, 46 and 50 may be formed by thermal fusion processes such as RF thermal fusion.

Map pouch 40 is releasably securable to tank bag 10 by a zipper generally indicated in FIG. 1 by reference numeral 52. Zipper 52 comprises a first row of zipper teeth 54 secured along upper edges of tank bag 10 adjacent seam 28, and a second row of zipper teeth 54 secured along edges of map pouch 40 adjacent seam 46, and a zipper tab 56 for interlocking and separating teeth of zipper teeth row 54 and zipper teeth row 55.

As shown in FIG. 3, map pouch 40 includes straps 58, 59 having quick-connect buckle connectors 60, 61 at the ends of straps 58 and 59 respectively. In the illustrated embodiment, male quick-connect buckle connectors 60, 61 of map pouch 40 are identical to quick-connect buckle connectors 14, 15 of tank bag 10. This allows map pouch 40 to be quickly connected with female or socket buckle connectors secured to the sport vehicle, so that map pouch 40 can be used alone without tank bag 10. Suitable quick-connect buckle connectors are well known. An example of this type of connector is, for example, disclosed in U.S. Pat. No. 4,712,280.

Straps 12 and 13 may be independently connected, such as by stitching or thermal fusion, to the bottom panel (not shown) of tank bag 10, or, alternatively, a single strap having strap ends 12 and 13 may be connected, such as by stitching or thermal fusion to the bottom panel of tank bag 10. As another alternative, tank bag 10 may be provided with one or more fabric loops or rings (such as metal or plastic rings) through which a strap having strap ends 12, 13 may be threaded, whereby the strap may be removed if desired. Likewise, straps 58 and 59 of map pouch 40 may be independently fastened to bottom panel 42 such as by stitching or thermal fusion, or a single strap having strap ends 58 and 59 can be fastened to bottom panel 42 such as with stitching or thermal fusion, or may be threaded through one or more fabric loops, one or more plastic or metal rings fastened to panel 42, or the like.

When tank bag 10 and map pouch 40 are used together, map pouch 40 is releasably attached to tank bag 10 by intermeshing zipper tooth row 54 fixed to tank bag 10 with zipper tooth row 55 fixed to map pouch 40, with straps or strap ends 58, 59 tucked into the space defined between upper panel 44 of tank bag 10 and lower panel 42 of map pouch 40. The combination tank bag with releasably attached map pouch is secured to sport vehicle 16 by engaging male connectors 14, 15 with female connectors secured to the sport vehicle. As is evident from the above description and the drawings, tank bag 10 can be secured to sport vehicle 60 by itself, or with map pouch 40 releasably attached to tank bag 10, and map pouch 40 can be secured by itself, without tank bag 10, to sport vehicle 16.

It will be apparent to those skilled in the art that various modifications to the preferred embodiment of the invention as described herein can be made without departing from the spirit or scope of the invention as defined by the appended claims.

What is claimed is:

1. Luggage for a sport vehicle comprising:
    a bag including a top panel, a bottom panel and one or more side panels, the bag further including at least one strap for releasably securing the bag to a sport vehicle; and
    a map pouch releasably attached to, and overlying, the top panel of the bag, the map pouch including an upper panel, at least a portion of the upper panel of the map pouch being transparent, whereby easy access to items stored in the bag is provided when the bag is mounted on a sport vehicle, while a map may also be visibly displayed through the transparent portion of the upper panel of the map pouch, wherein the map pouch and the bag each include a row of zipper teeth which intermesh with each other to releasably attach the map pouch to the bag, and wherein the map pouch further comprises a lower panel, the lower panel and the upper panel being secured together at their edges.

2. The luggage of claim 1, wherein an opening is defined in said upper panel of said map pouch for inserting a map.

3. Luggage for a sport vehicle comprising:
    a bag including a top panel, a bottom panel and one or more side panels, the bag further including at least one strap for releasably securing the bag to a sport vehicle; and
    a map pouch releasably attached to, and overlying, the top panel of the bag, the map pouch including an upper panel, at least a portion of the upper panel of the map pouch being transparent, whereby easy access to items stored in the bag is provided when the bag is mounted on a sport vehicle, while a map may also be visibly displayed through the transparent portion of the upper panel of the map pouch; said map pouch and said bag each including a row of zipper teeth which intermesh with each other to releasably attach the map pouch to the bag; wherein the map pouch further comprises a lower panel, the lower panel and upper panel being secured together at their edges.

4. The luggage of claim 3, wherein an opening is defined in said upper panel of said map pouch for inserting a map.

* * * * *